Aug. 19, 1952    Z. KUBIAK ET AL    2,607,152
LIVE BAIT CASTING DEVICE
Filed Nov. 8, 1949
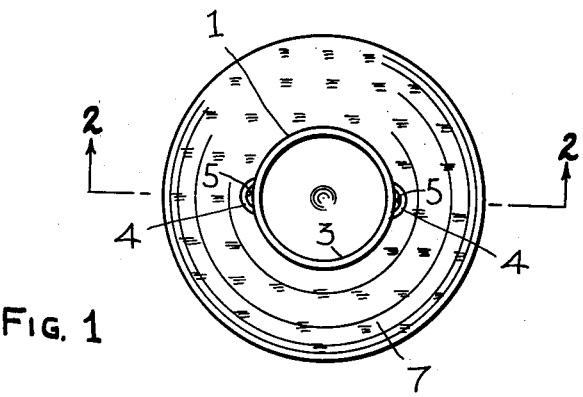
FIG. 1
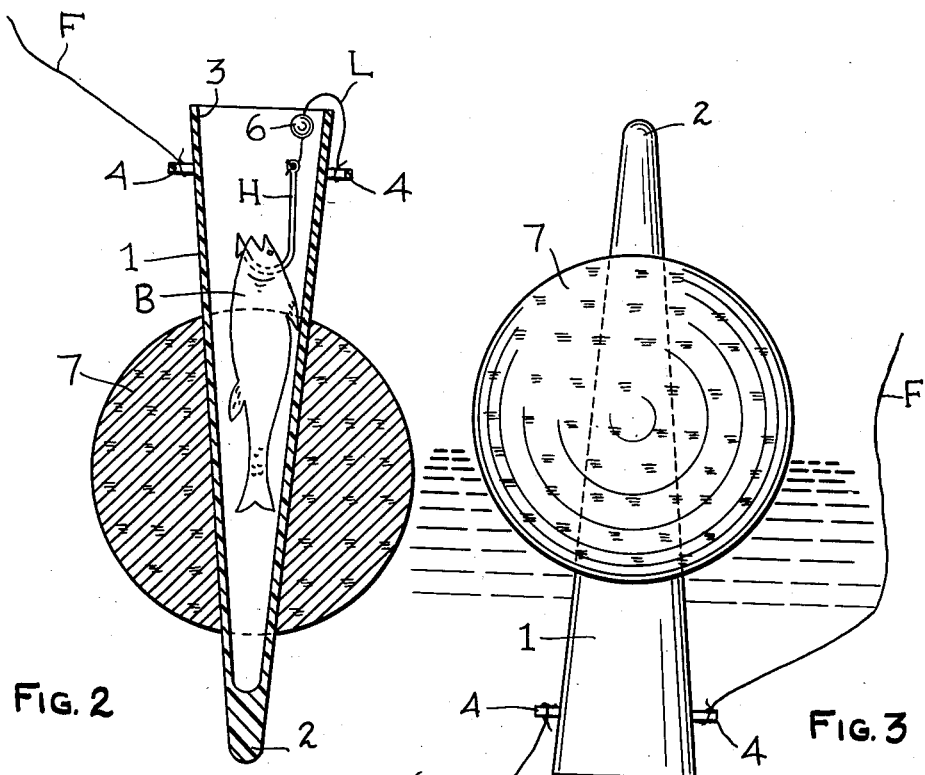
FIG. 2    FIG. 3
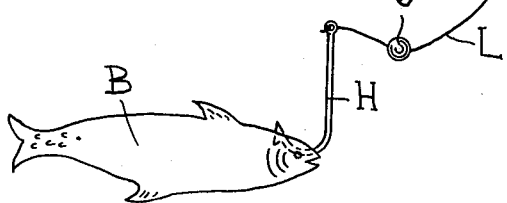
INVENTORS.
ZYGMUNT KUBIAK
BY FRANK NOCK
William Isler
ATTORNEY

UNITED STATES PATENT OFFICE 2,607,152

LIVE BAIT CASTING DEVICE

Zygmunt Kubiak and Frank Nock, Cleveland, Ohio

Application November 8, 1949, Serial No. 126,195

1 Claim. (Cl. 43—41.2)

This invention relates to floats such as are used by fishermen, and more particularly to a float which also serves as a casting device or container for live bait.

When using live bait, such as minnows, for fishing, it is customary to secure the bait on a hook which is attached to a suitably weighted line and then cast into the water.

This procedure is open to several objections. The primary objection is that the bait is often stunned or killed by its sudden impact on the water, and therefore cannot wriggle and move about to attract fish. The bait may also be weakened or stunned by its rapid flight through the air during the casting operation.

In any event, no matter what the cause, motionless or dead bait is in effect wasted live bait which does not produce the results for which every fisherman hopes.

It is a primary object of our invention to provide a bait casting device which will protect and shield the bait from the destructive impact with the water, which has heretofore been mentioned.

Another object of our invention is to provide a bait casting device which will serve to maintain the live bait in a fresh and lively condition.

Still another object of our invention is to provide a bait casting device in the form of a float, thereby serving a dual purpose.

A further object of the invention is to provide a bait casting device of the character described which will encourage emission of the bait at the proper time.

Still another object of our invention is to provide a combination bait casting device and float which is readily visible when cast into the water.

Another object of our invention is to provide a device of the character described, which can be easily and economically manufactured.

Other objects and advantages of the invention will be apparent during the course of the following description.

In the accompanying drawings, forming a part of this specification, and in which like numerals are employed to designate like parts throughout the same:

Fig. 1 is a top plan view of a bait casting device embodying the features of our invention.

Fig. 2 is a longitudinal cross-sectional view, taken on line 2—2 of Fig. 1.

Fig. 3 is an elevational view of the device as it appears in the water.

As best seen in Figs. 2 and 3, the bait casting device includes a hollow conical container 1 which is closed or sealed at its apex 2. The apex 2 serves as the bottom of the container during the casting operation and serves as the top of the float when the device is inverted in the water, as will be more fully described hereinafter.

Although any relatively light-weight material could be used for the container, we prefer that it be made of plastic or synthetic resin and have so indicated on the drawing.

The wide open end of the container 1 serves as a mouth 3 for the container which permits the bait B, in the form of a minnow or the like, to be placed therein.

On the exterior of the container 1, immediately below the mouth 3, are provided a pair of circumferentially spaced ears 4, each having a perforation or opening 5 extending therethrough.

The fishing line F is tied or otherwise secured to one of the ears 4 and a short leader line L is tied or secured to the other of the ears 4.

To the end of the leader L is attached a fish hook H of conventional style or form on which is stuck or impaled the live bait B.

A relatively heavy weight 6 in the form of a steel ball or the like is mounted on the leader line L intermediate the ends thereof.

A float 7 in the form of a sphere of wood or cork, is securely mounted on the container 1 and is traversed by the container so that it is disposed approximately midway between the apex 2 and the mouth 3 of the container, but slightly closer to the apex end thereof.

The float 7, as well as the apex 2 of the container, may be coated with a phosphorescent paint or the like, which, due to its light reflecting ability, will permit the device to be discerned by the fisherman, even under poor conditions of visibility.

When the hook has been baited, as aforesaid, the bait B is placed into the container 1, which preferably is filled with water. The water serves to maintain the bait in a fresh condition, and also provides additional weight to the device so as to assist the fisherman in casting it a goodly distance.

During the casting throw, the mouth 3 of the container 1 remains uppermost due to the pull exerted thereon by the fishing line F. In flight, therefore, the apex 2 of the container will lead the device and the longitudinal axis of the device will be angularly disposed to the vertical.

It will be apparent that during flight, the bait B, which lies in the container 1, is free from a pull or tension which may be exerted by the line F as the line F is not directly connected to the hook H, but, instead, is connected to one ear 4 of the container. The bait is also shielded by the container from the rigors of air flight and thus approaches its destiny in good condition.

When the device hits the water, the bait, of course, does not receive the direct impact of the shock, but instead the apex 2 of the container hits the surface of the water first, the shock being considerably lessened by the tapered form of the container.

The distribution of the mass of the device is such that the center of gravity thereof lies between the center of the float 7 and the mouth end 3 of the container. Therefore, when the device settles in the water, it inverts, the mouth end 3 being submerged and the apex end 2 being uppermost. The device thus assumes a substantially upright position and a considerable portion thereof projects above the surface of the water as a result of the buoyancy of the float 7.

The considerable portion of the device which thus projects from the water permits the fisherman to determine the location thereof easily and he can follow its movements without difficulty. As heretofore stated, the visibility of the float is enhanced by the coating which has been applied thereto.

When the device is inverted, the baited hook falls out of the container and the bait is free to move through the water, its travel being limited, however, by the leader L.

The ball weight 6 assists in drawing the leader line and the baited hook out of the container.

It is to be noted that the inclined or tapered interior wall surfaces of the container permit the bait to fall out easily and prevent wedging of the bait in the container. Were the interior of the container cylindrical in form, it is possible that the bait B might coil itself into a position where it would press tightly against the wall of the container. However, in our device, the inversion of the container easily dislodges the bait, as the progressively greater diameter of the container toward the mouth end 3 precludes any sticking of the bait in the container.

When the device is reeled in by the fisherman, the pull of the line F will cause the mouth end 3 of the container to lead the device. Therefore, when the device is hauled in by the fisherman, it already contains water so that it is prepared to receive the bait.

It is to be understood that the form of our invention, herewith shown and described, is to be taken as a preferred example of the same, and that various changes in the shape, size and arrangement of parts may be resorted to, without departing from the spirit of my invention or the scope of the subjoined claim.

Having thus described our invention, we claim:

In a device of the character described, a hollow conical bait container having its interior walls diverging toward the base of the cone and open-ended at said base, a float surrounding and secured to said container substantially midway between its ends, the center of gravity of said float and cone being intermediate the center of said float and the open end of said container, spaced ears secured to the side walls of the container adjacent the open end of the container, each of said ears being provided with openings through which a fishing line and a bait line may be passed for retention by said ears, said bait line extending into the container for attachment to the bait in said container.

ZYGMUNT KUBIAK.
FRANK NOCK.

REFERENCES CITED

The following references are of record in the file of this patent:

UNITED STATES PATENTS

| Number | Name | Date |
|---|---|---|
| 1,128,205 | White | Feb. 9, 1915 |
| 1,804,084 | Blake | May 5, 1931 |
| 2,292,743 | Cordry | Aug. 11, 1942 |
| 2,475,736 | Burrous | July 12, 1949 |
| 2,502,816 | Bennek | Apr. 4, 1950 |